United States Patent
Wilson et al.

(10) Patent No.: US 8,717,413 B2
(45) Date of Patent: *May 6, 2014

(54) IMAGING SYSTEM HAVING A FOLDED OPTICAL AXIS

(75) Inventors: Gordon Wilson, San Francisco, CA (US); Mark Wang, San Jose, CA (US)

(73) Assignee: Capso Vision Inc., Saratoga, CA (US)

( * ) Notice: Subject to any disclaimer, the term of this patent is extended or adjusted under 35 U.S.C. 154(b) by 760 days.

This patent is subject to a terminal disclaimer.

(21) Appl. No.: 12/463,488

(22) Filed: May 11, 2009

(65) Prior Publication Data

US 2010/0073459 A1 Mar. 25, 2010

Related U.S. Application Data

(60) Provisional application No. 61/052,180, filed on May 10, 2008.

(51) Int. Cl.
*H04N 7/00* (2011.01)

(52) U.S. Cl.
USPC .......................................................... 348/36

(58) Field of Classification Search
USPC .......................................................... 348/36
See application file for complete search history.

(56) References Cited

U.S. PATENT DOCUMENTS

| | | | |
|---|---|---|---|
| 4,787,725 A | 11/1988 | Preussner et al. | |
| 5,920,337 A | 7/1999 | Glassman et al. | |
| 6,731,845 B1 | 5/2004 | Gerdt | |
| 2003/0107789 A1 | 6/2003 | Hishioka | |
| 2004/0027451 A1 | 2/2004 | Baker | |
| 2005/0088762 A1* | 4/2005 | Ohashi | 359/754 |
| 2006/0178830 A1 | 8/2006 | Sherony | |
| 2007/0126911 A1* | 6/2007 | Nanjo | 348/335 |
| 2008/0100928 A1* | 5/2008 | Wilson | 359/725 |

OTHER PUBLICATIONS

Office Action, U.S. Appl. No. 12/877,220, Jan. 24, 2013.

* cited by examiner

*Primary Examiner* — Robert B Harrell
(74) *Attorney, Agent, or Firm* — Brosemer, Kolefas & Associates

(57) ABSTRACT

An imaging system having a folded optical axis that is accomplished through the effect of a first lens group, a prism, and a second lens group wherein a second surface of the prism is a mirror wherein the folded imaging system exhibits a horizontal field of view (HFOV) greater than 160 degrees and a vertical field of view (VFOV) greater than 80 degrees. Further aspects include a conjugate ratio of the lenses to be substantially 5.47 and a ratio of the entire lens focal length to the focal length of the first lens to be substantially −0.309.

12 Claims, 10 Drawing Sheets

IMAGING SYSTEM HAVING A FOLDED OPTICAL AXIS

RELATED APPLICATION

This application claims the benefit of U.S. Provisional Application No. 61/052,180 filed May 10, 2008 which is incorporated by reference in its entirety as if set forth at length herein.

FIELD OF THE DISCLOSURE

This disclosure relates generally to the field of optical imaging and in particular to an apparatus that provides a large field of view with a folded image.

BACKGROUND OF THE DISCLOSURE

In a number of applications the ability to produce a large field of view from an imager employing a folded image and a lens element before the fold is useful. Such arrangements however, have proved elusive.

SUMMARY OF THE DISCLOSURE

We have developed, in accordance with the principles of the disclosure, an imager which produces a large field of view from a folded image.

BRIEF DESCRIPTION OF THE DRAWING

A more complete understanding of the present invention may be realized by reference to the accompanying drawing in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

One aspect of the present disclosure is that of a folded imaging system which exhibits a relatively large field of view (FOV) while using only a single lens element between an object and the fold. As such, a system exhibiting this aspect of the present disclosure will be sufficiently compact for an array of applications including medical imaging.

Figure 1:
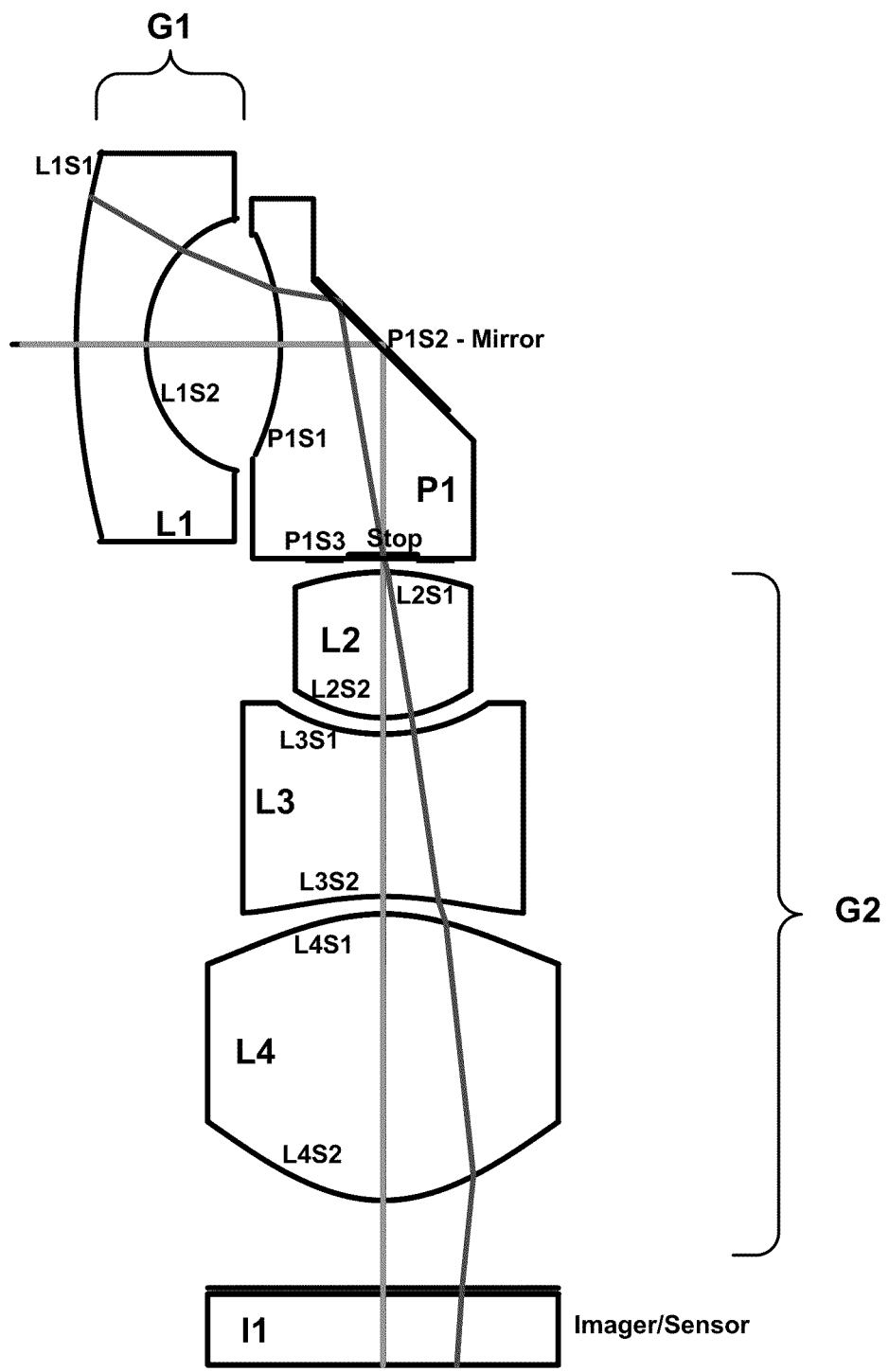
FIG. 1 shows a schematic of an exemplary imager according to an aspect of the present disclosure.

With reference to FIG. 1, there is shown an exemplary folded imaging system according to an aspect of this disclosure. As shown in that FIG. 1, a folded imager according to an aspect of the present disclosure has at least, in order from an object side, a first lens group G1 having a negative refractive power, a prism P1 having a first surface that is concave P1S1 and a second surface that is reflective (mirror) P1S2, and a second lens group G2 having a positive refractive power. An imager is positioned after the second lens group G2. Accordingly, light reflected from the object is imaged upon the imager through the effect of the first lens group G1, the prism P1, and the second lens group G2.

As may be appreciated by those skilled in the art, the imager may be any of a variety of known imagers, i.e., electronic or photochemical.

As shown in FIG. 1, first lens group G1 comprises a single lens L1 having two refractive surfaces, convex surface L1S1 and concave surface L2S2 which exhibits an overall negative refractive power. The second lens group G2 is shown comprising three lenses namely L2, L3, and L4. Each of the lenses includes two refractive surfaces. The first lens in group G2, lens L2, has two convex refractive surfaces L2S1 and L2S2. The second lens in group G2, lens L3, has two concave refractive surfaces L3S1 and L3S2.

Interposed between the two lens groups G1 and G2 is prism P1 which effects a fold of substantially 90 degrees to the overall optical path. As depicted in FIG. 1, prism P1 has three optical surfaces. A first surface, P1S1, is a concave refractive surface. The second surface of prism P1, is a reflective surface P1S1 and finally, the third surface P2S3 is shown as being substantially flat.

In an alternative embodiment, a stop, or aperture may be positioned at this P1S3 surface. In this manner, a very narrow exit is produced for light exiting the prism at this point. In addition, in a preferred embodiment, the chief rays will cross one another at that P1S3 surface.

Advantageously, a wide array of optical materials may be employed to construct the various elements of the folded imager. And while optical glass is generally suitable, newer, lighter materials offering increased manufacturability are preferred. More particularly, optical polycarbonates or olefin materials are good choices for constructing the individual lenses and/or prism.

Figure 2:
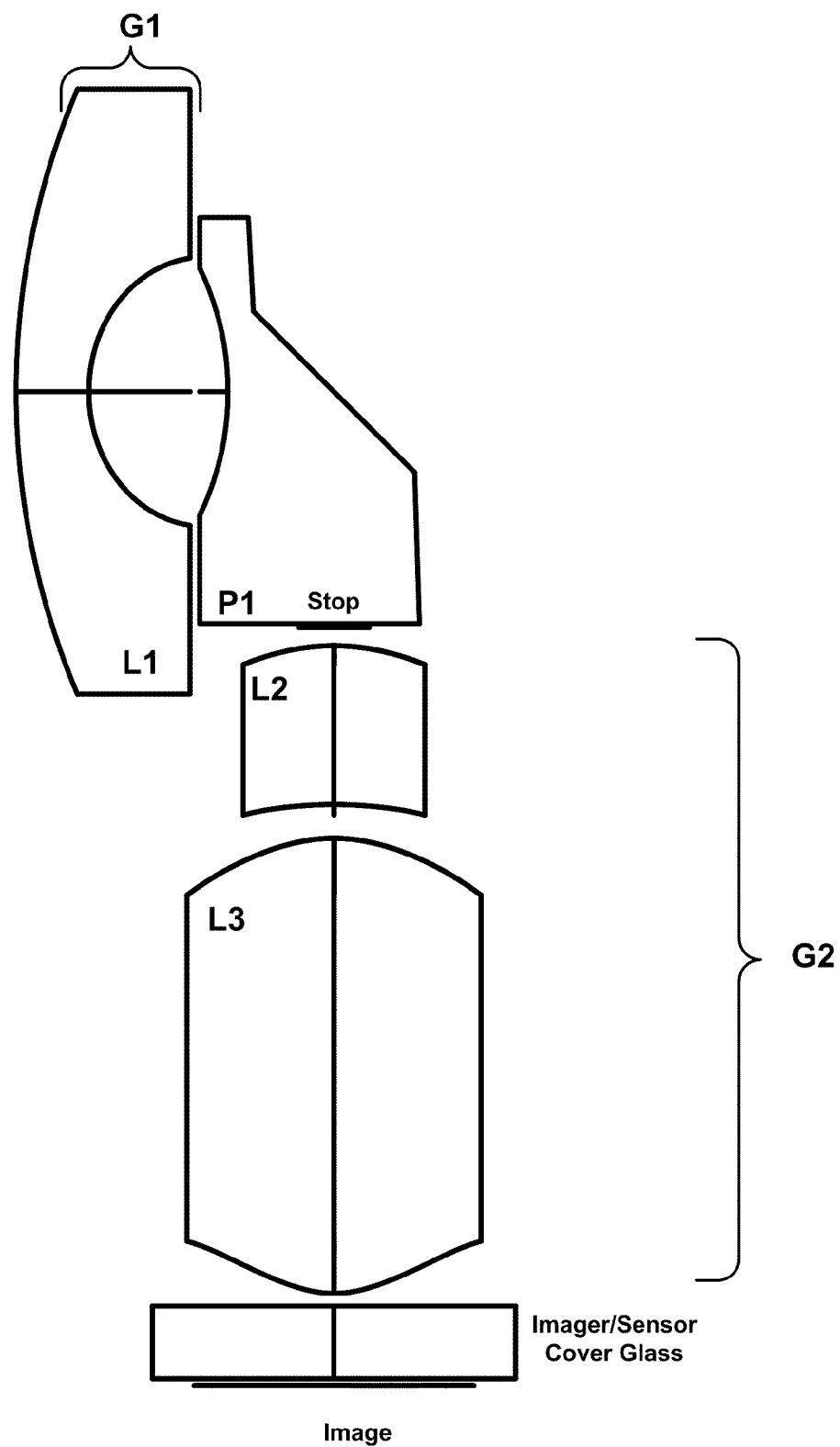
FIG. 2 shows a schematic of an alternative exemplary imager according to an aspect of the present disclosure.

With reference to FIG. 2, there is shown an exemplary alternative folded imaging system according to an aspect of this disclosure. As shown in that FIG. 2—and similarly to that shown in FIG. 1, the alternative folded imager has a first lens group G1 having a negative refractive power, a prism P1 having a first surface that is concave P1S1 and a second surface that is reflective (mirror) P1S2, and a second lens group G2 having a positive refractive power.

As shown in FIG. 2, first lens group G1 comprises a single lens L1 having two refractive surfaces, convex surface L1S1 and concave surface L2S2 which exhibits an overall negative refractive power. The second lens group G2 is shown comprising only two lenses namely L2 and L3. Each of the lenses includes two refractive surfaces. The first lens in group G2, lens L2, has a convex refractive surface L2S1 and a concave refractive surface L2S2. The second lens in group G2, lens L3, has two convex refractive surfaces L3S1 and L3S2.

Figure 3:
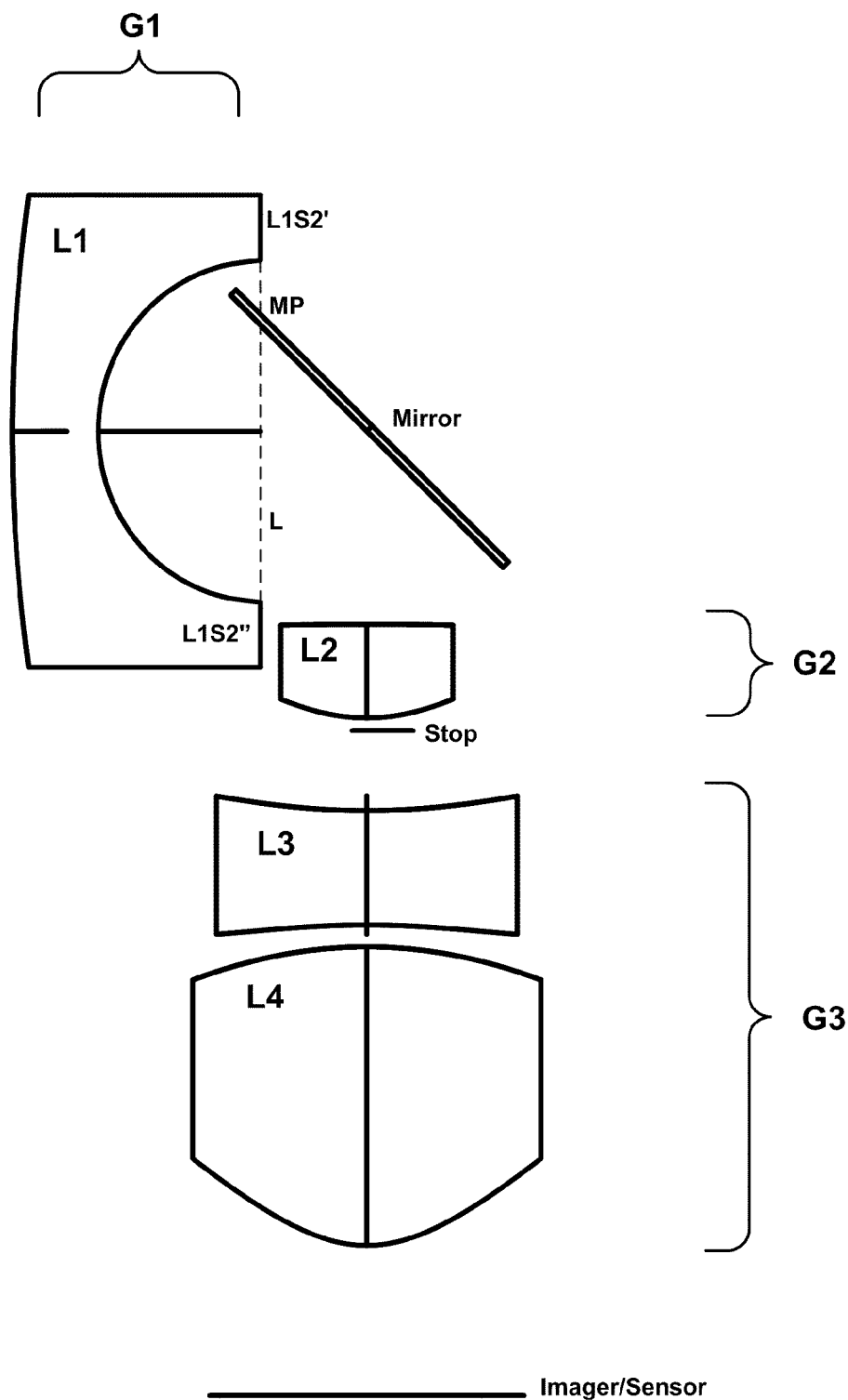
FIG. 3 shows a schematic of another alternative exemplary imager according to an aspect of the present disclosure.

Turning now to FIG. 3, there is shown another alternative embodiment of a folded imager according to an aspect of the present disclosure. As shown, this alternative folded imager has a first lens group G1 having a negative refractive power, a mirror M1, a second lens group G2 having a positive refractive power and a third lens group G3 having a positive refractive power.

As shown in FIG. 3, first lens group G1 comprises a single lens L1 having two refractive surfaces, convex surface L1S1 and concave surface L2S2 which exhibits an overall negative refractive power. The second lens group G2 is shown comprising only a single lens namely L2. Lens L2 has two refractive surfaces, a first substantially flat surface L2S1 and a second convex surface L2S2. An aperture or stop mechanism may be positioned at this second surface L2S2.

A third lens group G3 comprising two lenses L3 and L4 each having two refractive surfaces. More particularly, lens L3 has two concave surfaces L3S1, L3S2, while lens L4 has two convex surfaces L4S1 and L4S2.

With continued reference to FIG. 3, it is shown that the second surface of lens L1 has a pronounced concave surface L1S2. As shown, the mirror, M1, is positioned such that a portion of that mirror is within the concave region of that second surface L1S2. That is to say, if a line L were extended from the inner surfaces of that lens L1 from points L1S2' and L1S2" that line would intersect the mirror at some point MP.

Figure 4:
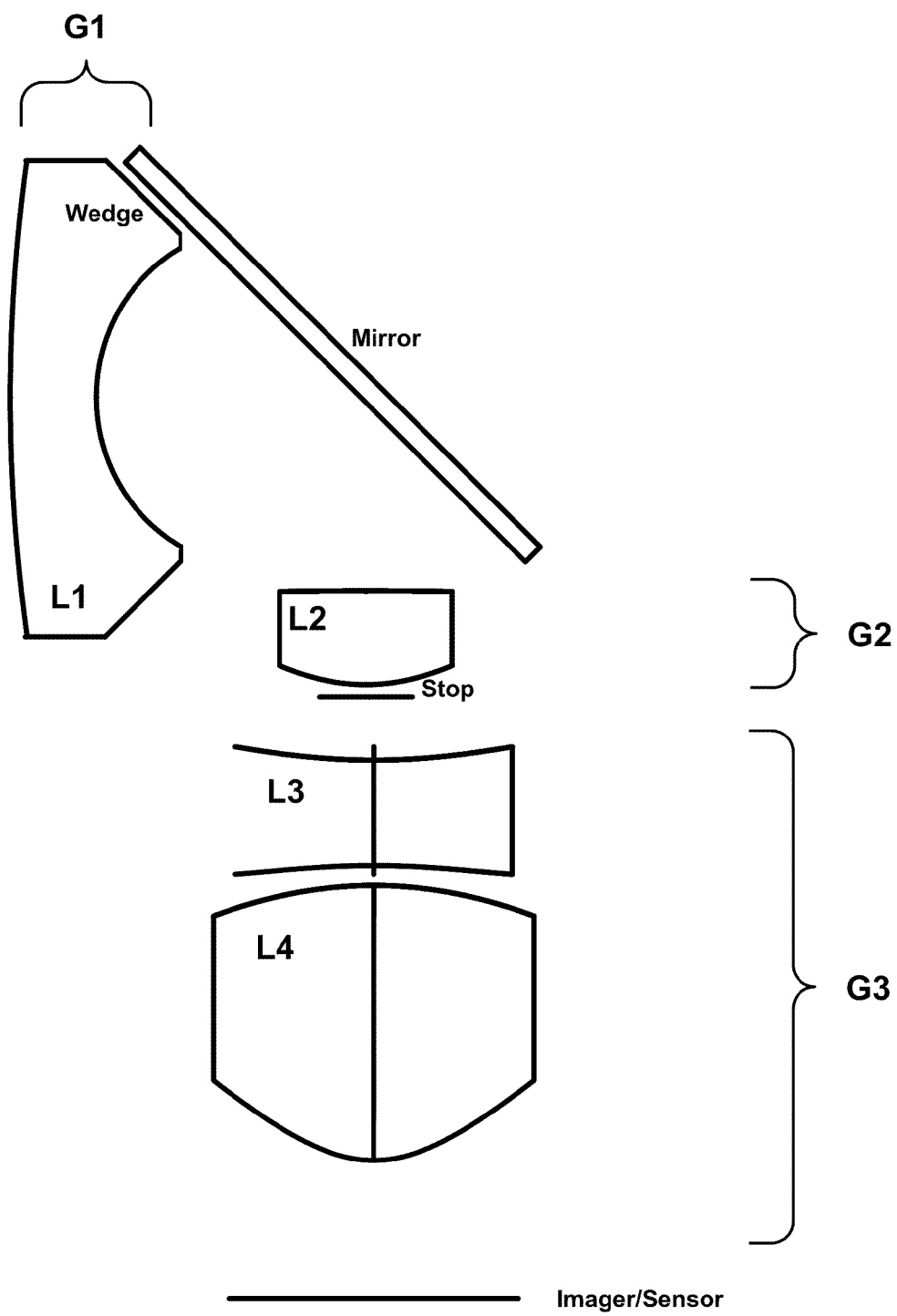
FIG. 4 shows a schematic of an alternative of the exemplary imager of FIG. 3.

FIG. 4 shows an alternative to that shown in FIG. 3. In particular, the folded imager again comprises three lens groups namely, G1, G2 and G3, wherein G1 comprises a single lens L1, G2 comprises a single lens L2 and G3 comprises two lenses L3 and L4. All of the refractive surfaces of the lenses are substantially as those shown previously in FIG. 3.

Notably however, the top surface of lens L1 has been shaped such that a "wedge" shape is produced in that top surface. In this manner, mirror M1 may extend outside of the curved inner refractive surface L1S2 along that wedge surface. As a result, the mirror M1 may be positioned adjacent to the wedge surface to provide additional stability and alignment to these components.

Figure 5:
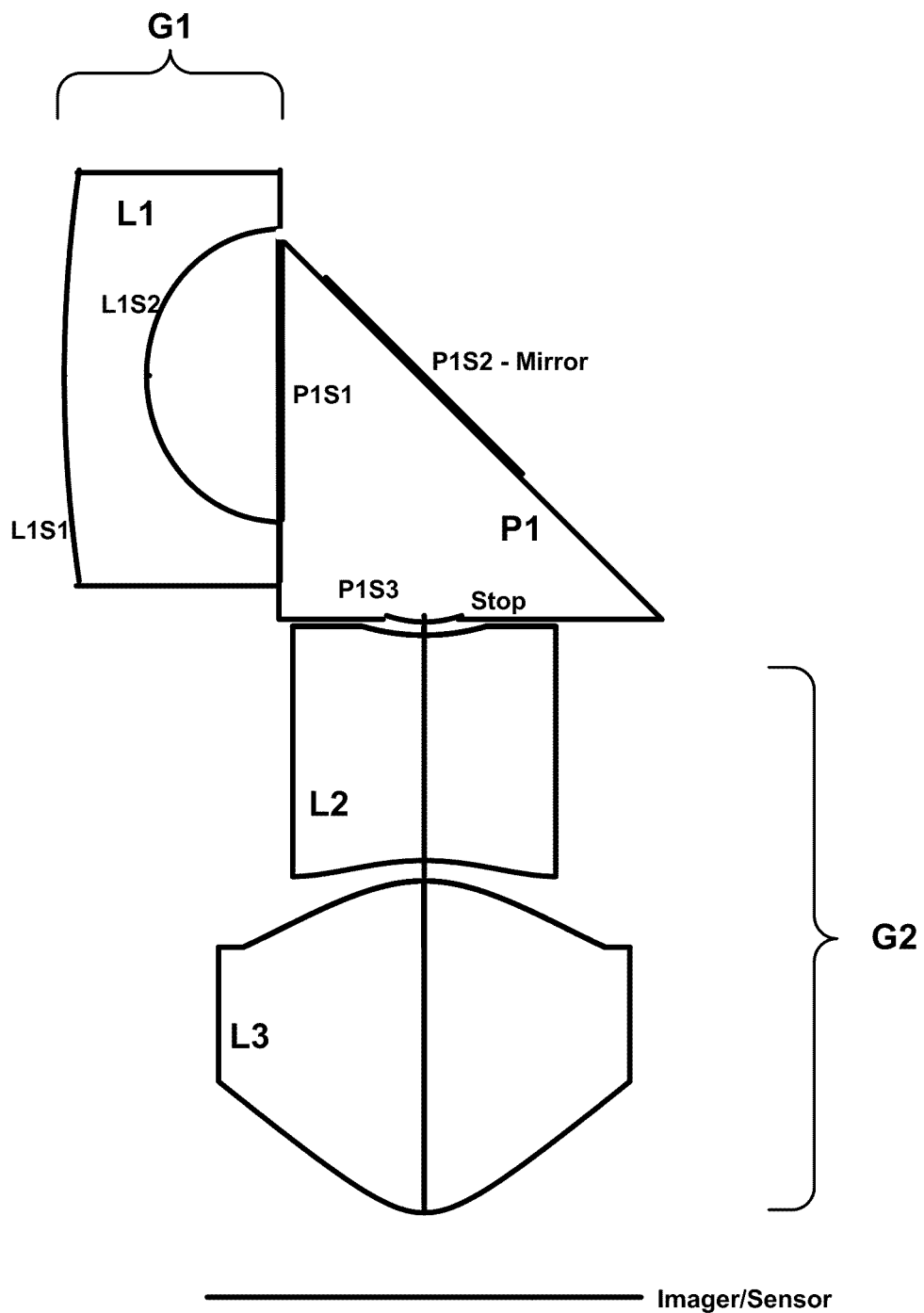
FIG. 5 shows a schematic of a folded imager according to an aspect of the present disclosure having a prism with convex surface.

Turning now to FIG. 5, there is shown yet another alternative embodiment of a folded imager according to an aspect of the present disclosure. As shown in that FIG. 5 the alternative folded imager has a first lens group G1 having a negative refractive power, a prism P1 having a first surface that is substantially flat P1S1, a second surface that is reflective (mirror) P1S2, and a third surface that is slightly convex P1S3, and a second lens group G2 having a positive refractive power.

The first lens group G1 comprises a single lens L1 having two refractive surfaces, convex surface L1S1 and concave surface L2S2 which exhibits an overall negative refractive power. The second lens group G2 is shown comprising only two lenses namely L2 and L3. Each of the lenses includes two refractive surfaces. The first lens in group G2, lens L2, has a concave refractive surface L2S1 and a second concave refractive surface L2S2. The second lens in group G2, lens L3, has two convex refractive surfaces L3S1 and L3S2.

Accordingly, light from an object will pass through L1 and enter prism P1 in which it is substantially reflected by mirrored surface P1S2. The reflected light is directed through convex surface P1S3 which may optionally include an aperture or other stop. The folded light is then directed through group G2, including lenses L2 and L3 which effect its formation of an image.

Figure 6:
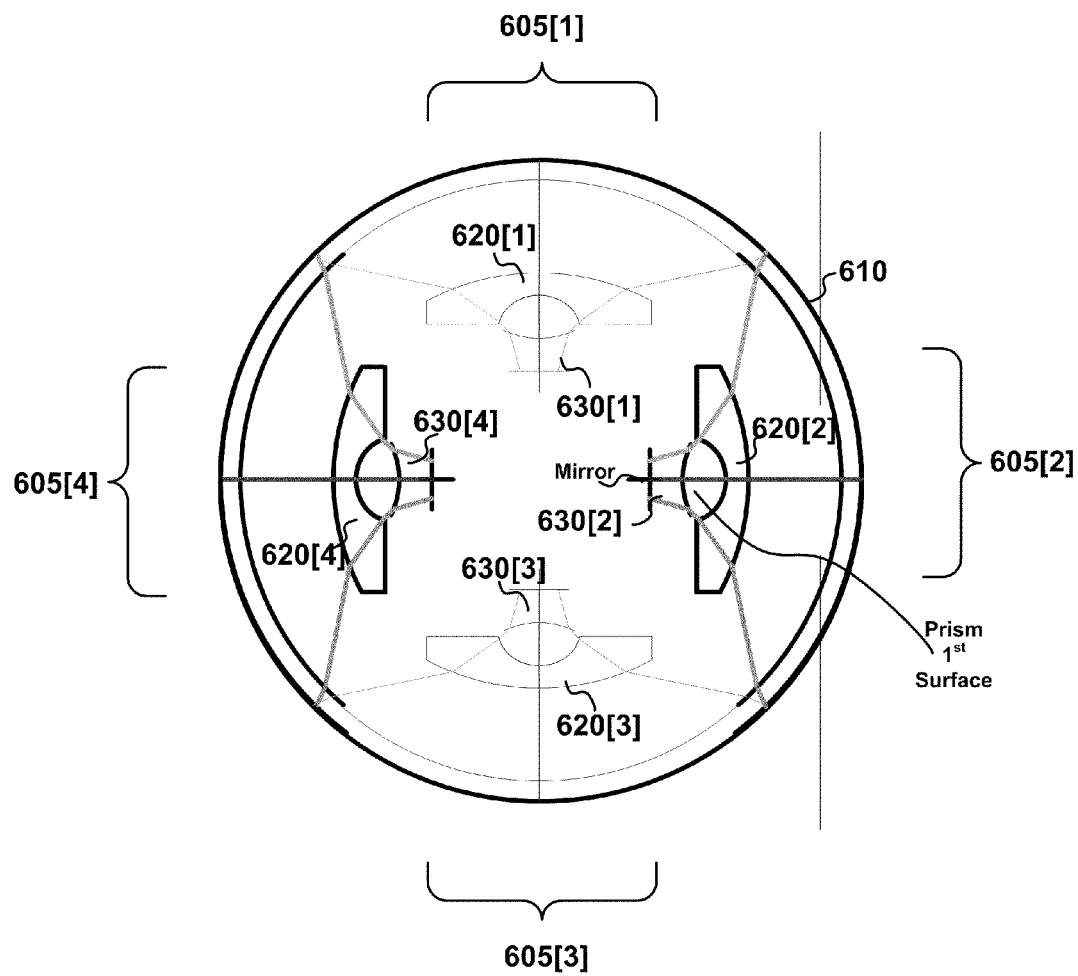
FIG. 6 shows in schematic form a top-cutaway-view of an exemplary panoramic camera system employing four folded imagers according to an aspect of the present disclosure.

Turning now to FIG. 6, there is shown a top-cutaway view of an imaging assembly according to an aspect of the present disclosure which advantageously permits imaging over a full 360 degree field-of-view.

The imaging assembly 600 as shown in FIG. 6 may advantageously comprise a "capsule" imager or camera, that is an imager that is capsule shaped and which permits the imaging of the entire circumference of the capsule.

In the exemplary embodiment shown in FIG. 6, positioned within a capsule housing 610 (shown with top cut-away) are optical and other components which form a folded imager as described previously. More particularly shown positioned within the capsule housing 610 are four folded imagers, 605[1], 605[2], 605[3] and 605[4]. Each of the individual imagers are positioned such that their horizontal (transverse) field of view (FOV) overlaps with the FOV of the adjacent imagers.

Accordingly, each of the individual folded imagers 605[1], 605[2], 605[3] and 605[4] has a FOV which is substantially greater than 90 degrees (FOV>>90) and as a result at least a full 360 degrees is imaged by the combined image(s). It should be noted, that while we have shown four (4) individual folded imagers within the capsule housing 610, those skilled in the art will appreciate that a greater number of imagers may be employed as practical and manufacturable.

As already noted, each of the folded imagers 605[1], 605[2], 605[3] and 605[4] are exemplary of those already described with respect to FIG. 1 and FIG. 2. More particularly, it is observed from this top view first lenses 620[1] . . . 620[4] (which comprise Lens L1 of Group G1 in the earlier presented figures). Similarly, it may be seen from this view the top of prisms 630[1] . . . 630[4], which are depicted as prism P1 in the earlier presented figures. As can be appreciated by this arrangement, light from the full 360 degrees of the capsule circumference is captured by on of the lenses 620[1] . . . 620[4], and folded through the effect of a respective prism 630[1] . . . 630[4], and subsequently imaged onto an appropriate imager positioned beneath (in this view) the lens/prism assembly in the capsule.

Figure 7:
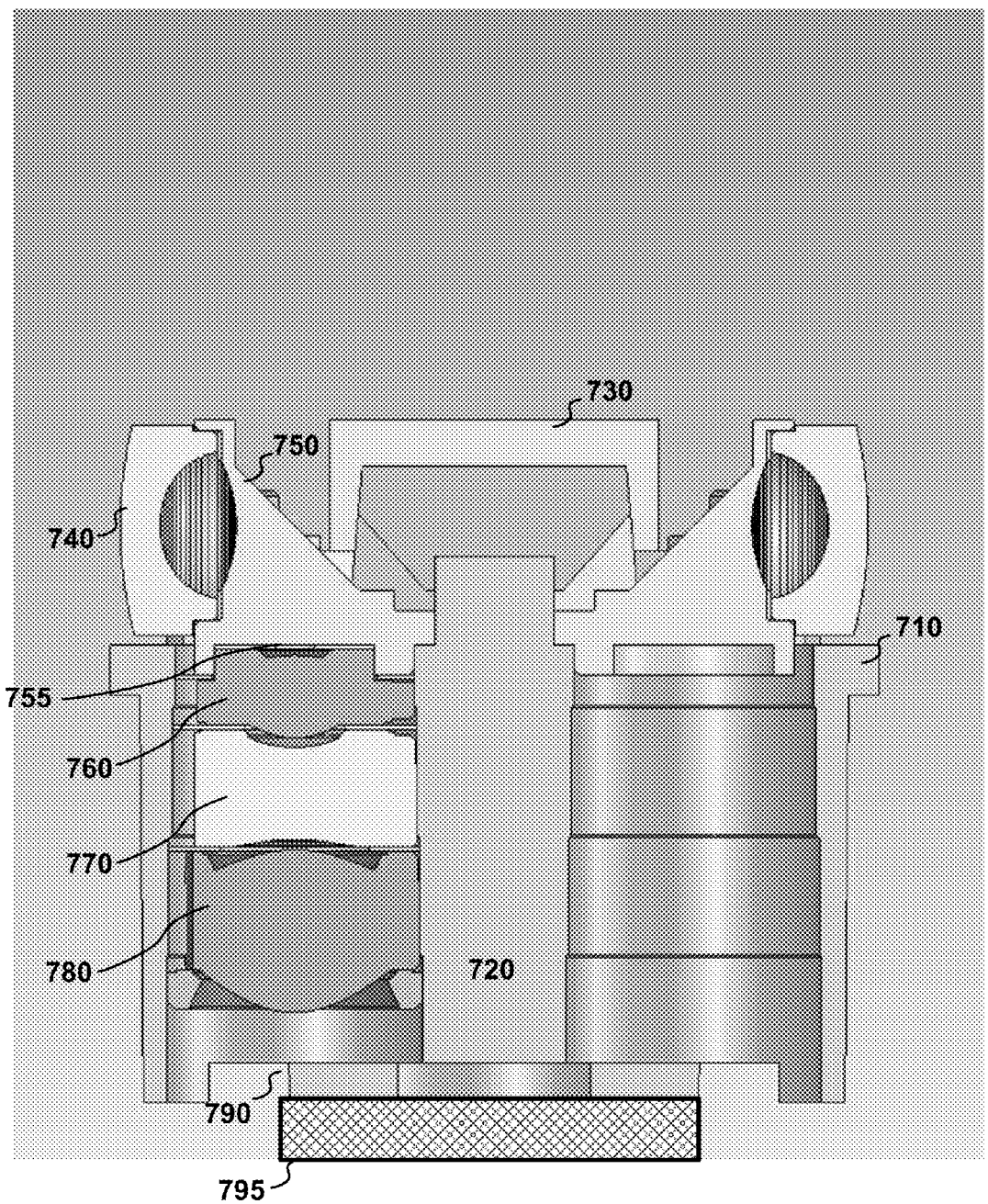
FIG. 7 shows in schematic form side-cutaway-view of an exemplary panoramic camera system employing four folded imagers according to an aspect of the present disclosure.

With these structures in mind, we may now turn to FIG. 7, which shows a side-cutaway view of an assembled folded imaging apparatus according to an aspect of the present disclosure. As can be readily appreciated by those skilled in the art, such an apparatus may be used as/in a capsule as appropriate.

Shown in that FIG. 7 is capsule housing or body 710 which in a preferred embodiment is substantially cylindrical in shape. Depending upon the particular configuration, the housing 710 may be open only at one end or alternatively may have a cover or cap placed at each end.

Shown positioned within the housing and in substantially axial alignment therewith, is a center hub or spindle 720. As will be appreciated, the spindle 720 is positioned at substantially the axial center of the housing 710, and thereby facilitates axial alignment of other elements positioned therein. Alternative arrangements (spindle-free) are contemplated, however in a preferred embodiment a spindle 720 may provide positive alignment of the imager components with the housing 710 and one another.

Positioned within the housing in a stacked arrangement, are (from an image side to an object side) a lens 780, a lens 770, a lens 760, a prism 750, and a lens 740. As can be understood with recollection to FIG. 1, the topmost lens in the figure, lens 740, comprises the first lens L1 in the first group G1, the prism 750 comprises the prism P1, while group G2 comprises lens L2 (760), lens L3 (770) and lens L3 (780).

In addition, a window 790 is positioned beneath the second group G2 and disposed beneath the window 790 is an imager 795. In this manner, light from an object (not specifically shown) is collected through the effect of lens 740, folded through the effect of prism 750, and subsequently imaged onto an imager 795 via window 790. Of course, those skilled in the art will at this point recognize that a number of variations to this general structure are possible, most notably the number of lenses comprising the various lens groups and their refractive characteristics.

In particular, while we are showing the exemplary capsule embodiments as having four (4) folded imagers, those skilled in the art will appreciate that more may be used as applications dictate. As noted earlier, in a preferred embodiment each of the imagers captures or exhibits an enhanced field of view which is greater than 90 degrees. Accordingly, each individual field of view captured by an individual imager will overlap with its adjacent imagers. In this manner, a full, panoramic 360 degree image may be constructed from images captured by each individual imager. To capture such images, each of the individual folded imagers are positioned substantially 90 degrees from one another when positioned within the imaging housing shown in FIG. 7.

The imaging assembly shown in FIG. 7 may be advantageously assembled individually, or as a series of sub-assemblies, depending upon the particular manufacturing method(s) employed. In particular, when individual components are employed, the assembly process may include positioning the elements within housing 710, including positioning spindle 720, positioning lens(es) 780, positioning lens(es) 770, positioning lens(es) 760, positioning prism(s) 750, and finally positioning lens(es) 740. The entire assembly may then be maintained in overall position by applying top 730 which may secure the entire assembly into housing 710.

Advantageously, it is noted that the individual lens(es) of a particular folded imager may be fabricated on a single circular structure—which may contain all four like lenses—which in turn may be positioned in the circular housing 710. In particular, a single circular structure may include all four lenses 780, which is positioned upon spindle 720 in housing 710. The successive lens(es) are then positioned upon the lower ones, followed by the prism and finally the last lens(es). Still alternatively, a subassembly comprising the spindle and the lens "rings" or structures positioned thereon, and the entire sub-assembly then positioned within the housing 710.

Figure 8:
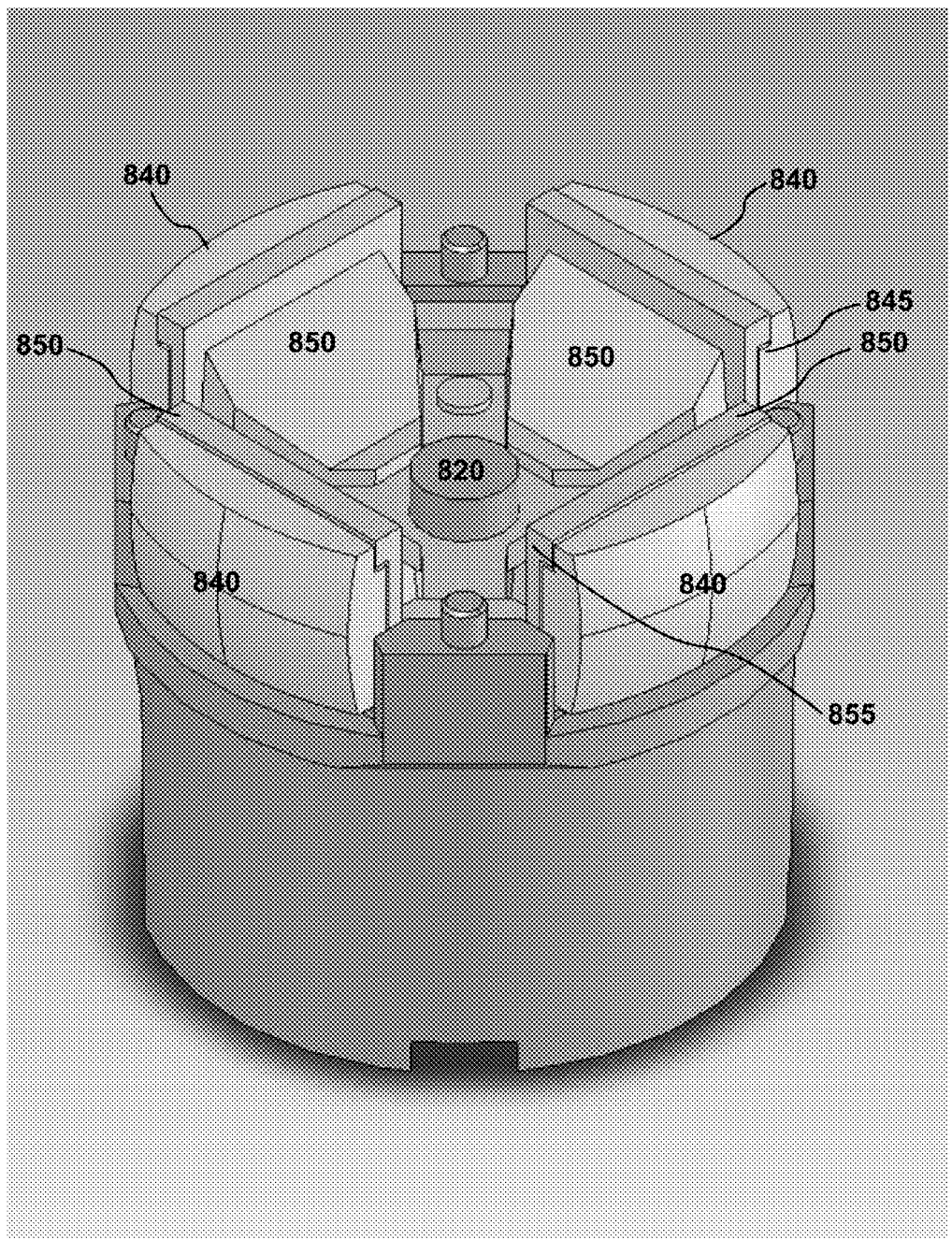
FIG. 8 shows in schematic form a perspective cutaway-view of an exemplary panoramic camera system employing four folded imagers according to an aspect of the present disclosure.

Turning now to FIG. 8, there is shown a perspective view of a partially assembled panoramic camera system employing four folded imagers according to the present disclosure. In particular, it is shown positioned within housing 810 is spindle 820, four prisms 850, four lenses 840. Shown in this figure are notches 855 formed on a front face of each prism 850, and mating tabs 845 formed on back (prism side) of each lens 845. Such notches and tabs provide a secure, positive alignment between the lenses 840 and the prisms 850.

Figure 9:
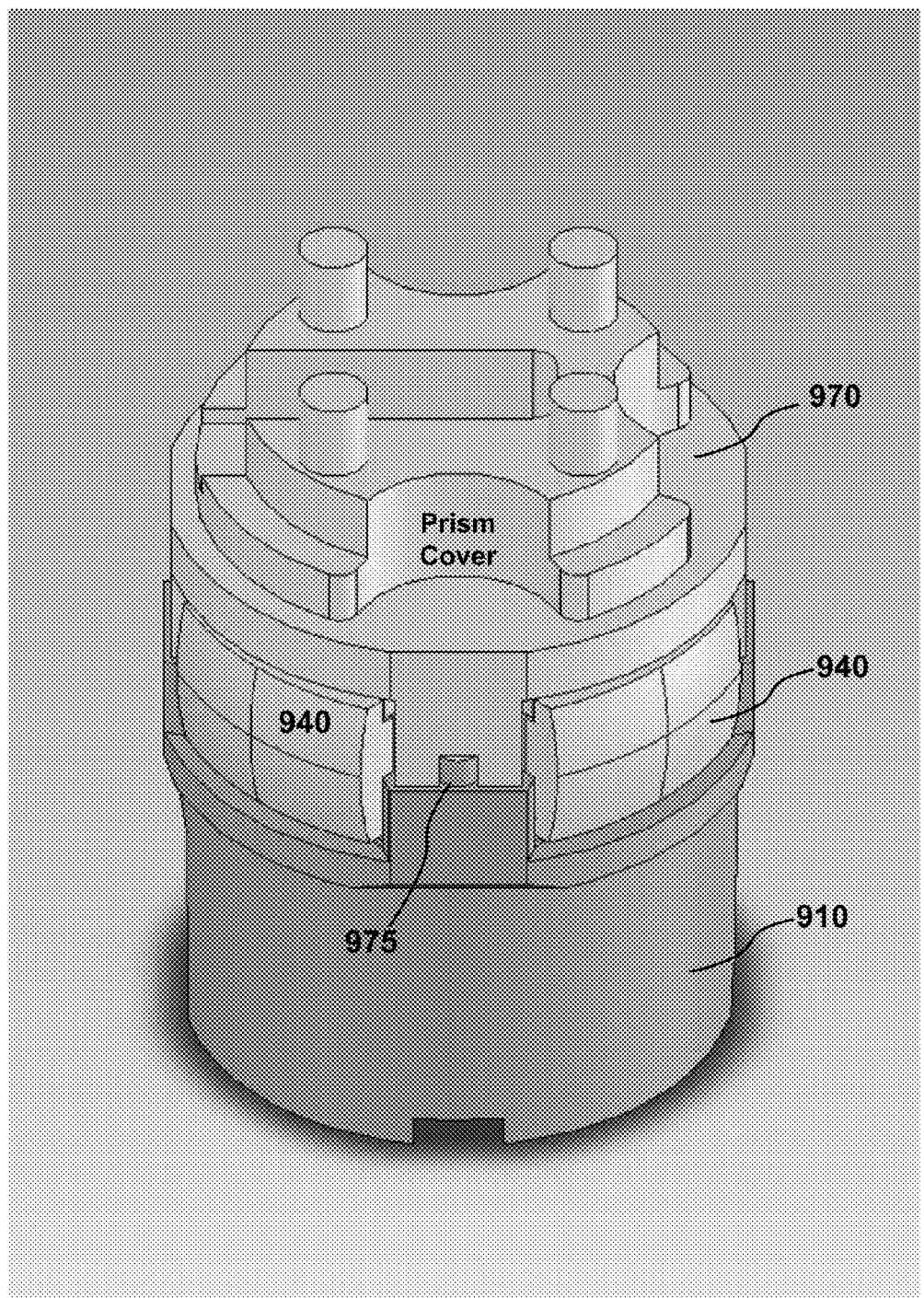
FIG. 9 shows in schematic form a perspective view of an assembled panoramic camera system according to an aspect of the present disclosure.

FIG. 9 shows a perspective view of an assembled panoramic camera system employing four folded imagers according to the present disclosure. In particular, shown positioned within housing 910 are lenses 940 wherein the entire assembly is held in place by an overall prism cover 970. As shown in that figure, the prism cover 970 may be aligned and/or positioned through the use of locator pins 975 or tabs formed from the housing 910.

Figure 10:
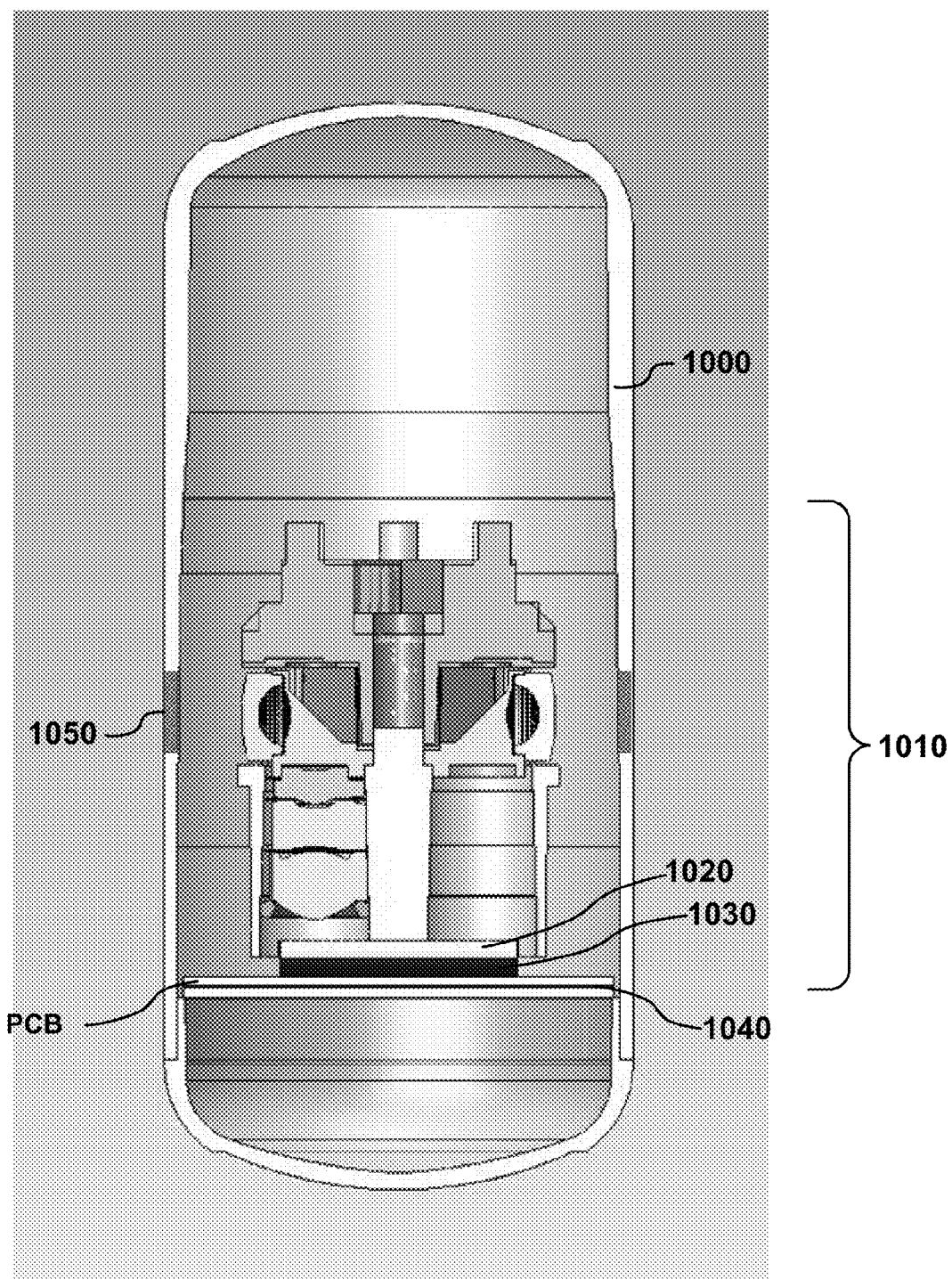
FIG. 10 shows a schematic of an exemplary capsule containing an assembled panoramic camera system employing folded imagers according to an aspect of the present disclosure.

FIG. 10 shows a cutaway-side view of a panoramic capsule which contains a panoramic camera and folded imager(s) according to an aspect of the present disclosure. More particularly, capsule body 1000 may be made from any small, preferably swallowable, bio-compatible material. Along the sides of the capsule body 1000 are windows 1050, which are positioned in substantial alignment with panoramic camera assembly 1010 that is securely positioned within the capsule 1000.

Positioned beneath the assembly 1010 is a window 1020 which permits captured light to exit the assembly 1010 and impact the imaging sensor 1030. In this configuration, additional electronics and/or processing may be provided upon PCB 1040.

Accordingly, as the overall capsule 1000 moves through—for example, a large intensine—light entering windows 1020 is captured by lenses L1, folded by prism P1, and further directed to window 1020 and imaging sensor 1030 through the effect of lenses L2, L3, and L4. Since each one of the individual folded imagers captures images from a field of view that is greater than 90 degrees, the images from each of the individual imagers may be combined into an overall panoramic image. Accordingly, such a panoramic capsule may panoramically capture images from a trip through—for example—a large intestine. Once captured, the images may be transmitted wirelessly to a receiver located outside the capsule (and the intestine) or alternatively be off-loaded upon passing of the capsule.

At this point we note that an interesting "super conic" solution proposed by Alan Greynolds of Breault Research Organization expands in powers of the distance from a vertex to a point on a surface. The expansion may be described in terms of $s^2 = x^2 + y^2 z^2$.

Starting with the conic equation for a surface, $kz^2 - 2R + x^2 + y^2 + z^2 = 0$, where k is the conic constant and R is the radius of curvature, a general power series expansion may be made of the form $Az^2 - 2Bz + C = 0$ and the constants are defined as:

$$A = \frac{k}{R}, B = 1 + U_1 s^2 + U_2 s^4 + \ldots, \text{ and } C = \frac{s^2}{R} + V_1 s^4 + V_2 s^6 + \ldots .$$

Table 1 and Table 2 show the dimensional and overall characteristics of the optical elements by surface for the exemplary embodiment(s) shown and described herein.

TABLE 1

| Surface | Type | Comment | Curvature | Radius | Thickness |
|---|---|---|---|---|---|
| 1 | TOROIDAL | Window | 0.17699 | 5.65000 | 0.35000 |
| 2 | TOROIDAL | | 0.18868 | 5.30000 | 1.65000 |
| 3 | STANDARD | 1st Lens | 0.23604 | 4.23651 | 0.40000 |

TABLE 1-continued

| Surface | Type | Comment | Curvature | Radius | Thickness |
|---|---|---|---|---|---|
| 4 | STANDARD | | 1.17566 | 0.85058 | 0.76600 |
| 5 | STANDARD | Prism 1st Surface | −0.74251 | −1.34677 | 0.58400 |
| 7 | STANDARD | Fold Mirror | 0.00000 | Inf | 0.00000 |
| 9 | STANDARD | Prism | 0.00000 | Inf | 0.00000 |
| 10 | STANDARD | | 0.00000 | Inf | −0.10000 |
| 11 | STANDARD | 2nd Lens | −0.76649 | −1.30465 | −0.83088 |
| 12 | STANDARD | | 1.27987 | 0.78133 | −0.09347 |
| 13 | STANDARD | 3rd Lens | 0.84388 | 1.18500 | −0.92685 |
| 14 | SUPERCONIC | | −0.51880 | −1.92753 | −0.10000 |
| 15 | SUPERCONIC | 4th Lens | −0.83339 | −1.19992 | −1.63563 |
| 16 | SUPERCONIC | | 1.15720 | 0.86464 | −0.50000 |
| 18 | STANDARD | Cover Glass | 0.00000 | Inf | −0.40500 |
| 19 | STANDARD | Image | 0.00000 | Inf | 0.00000 |

TABLE 2

| Surface | Refractive Index | Abbe number | Conic | Superconic aspheric terms | | | |
|---|---|---|---|---|---|---|---|
| | | | | U1 | V1 | U2 | V2 |
| 1 | 1.5855 | 29.91 | 0.00 | | | | |
| 2 | | | 0.00 | | | | |
| 3 | 1.5253 | 55.95s | 0.00 | | | | |
| 4 | | | 0.35 | | | | |
| 5 | 1.5253 | 55.95 | −1.45 | | | | |
| 7 | | | 0.00 | | | | |
| 9 | 1.5253 | 55.95 | 0.00 | | | | |
| 10 | | | 0.00 | | | | |
| 11 | 1.5253 | 55.95 | −4.19 | | | | |
| 12 | | | −1.15 | | | | |
| 13 | 1.5855 | 29.91 | 0.92 | | | | |
| 14 | | | −15.00 | 1.7661 | −.8681 | −.4330 | 0.9628 |
| 15 | 1.5253 | 55.95 | −9.04 | −1.431 | 0.5129 | | |
| 16 | | | −2.92 | 0.9462 | 1.2851 | 0.4712 | −.0185 |
| 18 | 1.5168 | 64.17 | 0.00 | | | | |
| 19 | | | 0.00 | | | | |

An exemplary embodiment according to the present disclosure may include an optical imaging system having a first lens group with negative power, a prism, a second lens group of positive power wherein the first surface of the prism is concave, the second surface of the prism is a mirror that folds the optical axis. Such a system may exhibit a HFOV >160deg and VFOV >80deg. It may exhibit a conjugate ratio of 5.47. Finally, it may exhibit a ratio of entire lens focal length to first lens focal length=−0.309, or one wherein the overall focal length of the system to the focal length of the first lens group is greater than −0.32 and less than 0. Such a system may advantageously include a system capsule with a diameter less than 13 mm in which an outer circumference is imaged in its entirety by a plurality of cameras with overlapping fields of view sharing a common image plane.

At this point, while we have discussed and described our disclosure using some specific examples, those skilled in the art will recognize that my teachings are not so limited. Accordingly, our disclosure should be only limited by the scope of the claims attached hereto.

What is claimed is:

1. An imaging system having a folded optical axis comprising:
   a first lens group exhibiting a negative optical power;
   a second lens group exhibiting a positive optical power;
   a prism interposed between the first lens group and the second lens group such that it directs light exiting the first lens group into the second lens group, and
   a sensor for detecting images directed thereupon by the second lens group;
   wherein said imaging system exhibits a horizontal field of view that is greater than 160 degrees and a vertical field of view that is greater than 80 degrees;
   wherein the ratio of the overall focal length of the system to the focal length of the first lens group is greater than −0.32 and less than 0.

2. The imaging system of claim 1 wherein the prism has a surface that is concave.

3. The imaging system of claim 2 wherein the concave surface of the prism is that surface of the prism through which light enters the prism after exiting the first lens group.

4. The imaging system of claim 1 wherein the prism has a surface that is convex.

5. The imaging system of claim 4 wherein the convex surface of the prism is that surface of the prism through which light is directed from the prism into the second lens group.

6. The imaging system of claim 1 wherein the prism has a reflective surface that folds the optical axis.

7. The imaging system of claim 6 wherein the optical axis is folded by substantially 90 degrees.

8. The imaging system of claim 1 further comprising a capsule housing wherein the imaging system is positioned within the capsule housing.

9. The imaging system of claim 8 further comprising a window that is substantially transparent to wavelengths of light detectable by the sensor, wherein said window is part of said housing and is positioned substantially 1.65 mm from the first lens group.

10. The imaging system of claim 1 wherein the ratio of the overall focal length of the system to the focal length of the first lens group is substantially −0.309.

11. The imaging system of claim 1 wherein the conjugate ratio is substantially 5.47.

12. The imaging system of claim 1 wherein said first lens group consists of a single lens.

* * * * *